United States Patent [19]
Fenner

[11] 3,911,662
[45] Oct. 14, 1975

[54] STEEL TIRE CORDS, METHOD OF MAKING SAME AND ARTICLES CONTAINING SAME

[75] Inventor: James M. Fenner, Niles, Mich.

[73] Assignee: National-Standard Company, Niles, Mich.

[22] Filed: Jan. 22, 1973

[21] Appl. No.: 325,262

[52] U.S. Cl. .................. 57/149; 57/139; 57/145; 57/156; 57/162
[51] Int. Cl.² ........................................... D02G 3/42
[58] Field of Search ............ 57/145, 148, 149, 160, 57/162, 139

[56] References Cited
UNITED STATES PATENTS

| | | | |
|---|---|---|---|
| 2,491,293 | 12/1949 | Zerr | 57/148 X |
| 2,492,352 | 12/1949 | Bourdon | 57/148 |
| 2,900,785 | 8/1959 | Fenner | 57/149 X |
| 3,090,189 | 5/1963 | Boussu et al. | 57/139 |
| 3,209,528 | 10/1965 | Zerr | 57/145 |
| 3,443,374 | 5/1969 | Carnevale | 57/149 |
| 3,534,542 | 10/1970 | West | 57/149 X |
| 3,600,884 | 8/1971 | Yazawa et al. | 57/139 |
| 3,762,145 | 10/1973 | Kikuchi et al. | 57/145 |

*Primary Examiner*—John Petrakes
*Attorney, Agent, or Firm*—Johnson, Dienner, Emrich & Wagner

[57] ABSTRACT

A cord comprising a plurality of strands of steel wires twisted together, and in which the wires of the strands are substantially free of twist but have a permanent set providing force for locking together the twisted strands of the cord.

A method of making a cord in which a plurality of strands are provided by twisting a plurality of steel wires together in one direction, then twisting a plurality of such strands together in a direction opposite the direction in which the wires of the strands were twisted together.

An article comprising a cord embedded in a body of elastomeric material which extends into the interstices of the cord, in which the cord comprises a plurality of strands of steel wires twisted together, and in which the wires of the strands are substantially free of twist but have a permanent set providing force for locking together the twisted strands of the cord.

12 Claims, 7 Drawing Figures

STEEL TIRE CORDS, METHOD OF MAKING SAME AND ARTICLES CONTAINING SAME

BACKGROUND OF THE INVENTION

1. Field of the Invention

The present invention is in the field of the cord art, such as steel cords which may be embedded in elastomeric material for use, for example, in the pneumatic tirebuilding art for reinforcement purposes in tire carcass material, and tire breaker components for reinforcing the tread of a pneumatic tire.

2. Description of the Prior Art

It is known to provide metallic cords comprising many combinations of wires twisted or stranded together and to embed the cords in elastomeric material for reinforcement purposes. The following U.S. patents issued to applicant, and Canadian Patent No. 827,935 issued Nov. 25, 1969, to Lejeune disclose cord structures typical of the prior art:

No. 2,900,784 dated Aug. 25, 1959
No. 2,900,785 dated Aug. 25, 1959
No. 3,032,963 dated May 8, 1962

SUMMARY OF THE INVENTION

The present invention provides a cord construction in which a plurality of strands of steel wires are twisted together, and in which the wires of the strands are substantially free of twist and have a permanent set providing force for locking together twisted strands of the cord. The aforenoted cord construction, according to the method of the invention, is achieved by providing a plurality of strands of wire twisted together in one direction, and then twisting a plurality of such strands together in the opposite direction in which the wires of the strands were twisted together. The invention further comprehends embedding a cord as aforenoted in a body of elastomeric material for reinforcement purposes.

DESCRIPTION OF A PREFERRED EMBODIMENT OF THE INVENTION

Figure 1:
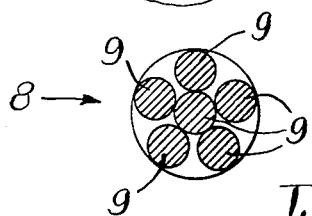
FIG. 1 is a cross-sectional view of a strand of six steel wires twisted together in one direction.

Upon reference now to FIG. 1 there is shown a strand 8 composed, by way of example, of six steel wires 9 twisted together in one direction. A plurality of such strands 8, for example, four in number, as shown in FIG. 3, have, in accordance with this invention, been twisted together in a direction opposite the direction of the twisting of the wires or filaments 9 of FIG. 1 to form cord 11.

Figure 2:
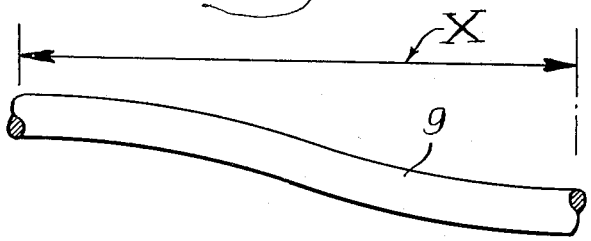
FIG. 2 is a side elevational view of a portion of one of the wires of the strand of FIG. 1.
Figure 4:
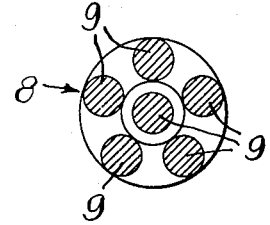
FIG. 4 is a cross-sectional view of one of the strands of FIG. 3.
Figure 5:
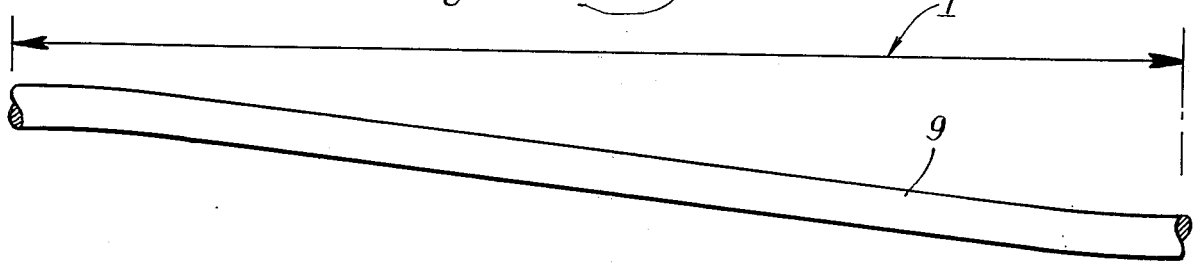
FIG. 5 is a side elevational view of a portion of one of the wires of the strand of FIG. 4.
Figure 6:
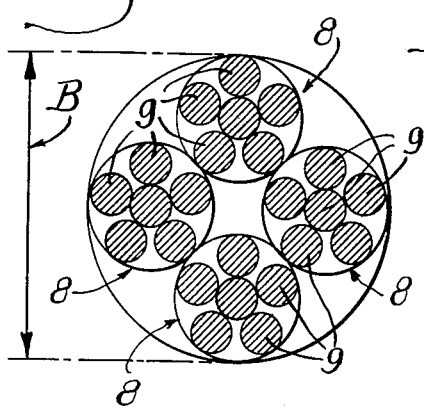
FIG. 6 is a cross-sectional view of a cord composed of four six-wire strands twisted together in the same direction.

In order to understand the unique aspects of the present invention reference may be had to FIG. 2 in which a portion of one of the wires 9 of strand 8 of FIG. 1 is shown. It will be noted that strand 9 has a twisted left lay portion of a given length, for example of a length of 0.436 inch, indicated at X. When a plurality of strands 8, as shown in FIG. 3, are twisted together in a direction opposite the direction of the twisting together of the wires 9 in forming the strand 8, the lay of the wires 9 increase. This may be best seen from FIGS. 4 and 5. FIG. 4 is a cross-sectional view of one of the strands of the cord of FIG. 3 with one of the wires 9 being shown in FIG. 5 from which it will be observed that the right lay of wire 9 there shown has been substantially increased, for example of a length of 1.250 inches, as indicated by dimension Y as compared to dimension X of FIG. 2. This is because the amount of twist imparted during the final twisting operation lessened the amount of twist in the strand. That is, it untwisted the strand. By comparing FIG. 4 with FIG. 1 it will also be noted that the diameter of the strand 8 has increased. The permanent set made in the wires 9 by twisting them together in the forming of strand 8 is the same in the portion of the wire 9 as shown in FIGS. 2 and 5. The increased diameter of the strand 8 as shown in FIG. 4 over that of strand 8 shown in FIG. 1 is caused by the restraining of the wires 9 in the cord from assuming their natural positions. Thus the diameters of the wires 9 in the strand remain the same, but the diameter of the cord 11, as indicated at A in FIG. 3, is greater than the diameter indicated at B of FIG. 6 which illustrates four twisted strands of six wires each but in which the strands have not been reversely twisted.

An important aspect of the invention is that the wires of the several strands are substantially free of twist which, however, is not meant to mean that the wires may not have a slight twist in either direction without affecting the foregoing locked cord of the invention.

Figure 3:
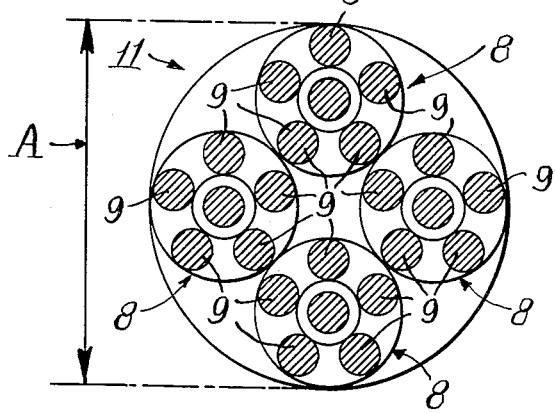
FIG. 3 is a cross-sectional view of a cord according to the present invention in which four strands of the construction shown on FIG. 1 have been twisted together in a direction opposite the direction in which the wires of these strands were twisted together.
Figure 7:
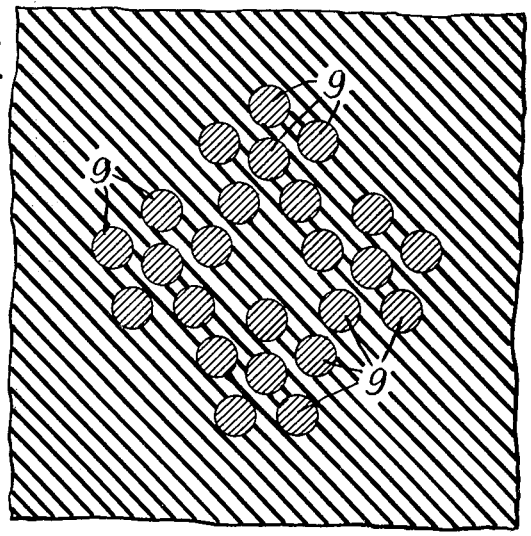
FIG. 7 is a cross-sectional view showing the cord of the present invention embedded in a rubber article.

As will be apparent from FIG. 3 the cord has open interstices into which an elastomeric material, such as rubber, embeds itself, as shown in FIG. 7, so that each wire or filament is surrounded by the elastomeric material providing improved performance which the steel wires or filaments are working or deflecting in a rubber body, such as in the carcass or breaker component of a pneumatic tire.

In the present invention large diameter steel wires may be used for pneumatic tire purposes. As an example, in a belted passenger tire the steel wire diameter may be of the order of 0.0098 to 0.0118 inches. Similarly in pneumatic truck tire carcass reinforcements wires of a diameter in a range of from 0.0069 inches to 0.0091 inches may be employed in practicing the invention. The use of larger diameter wires results in substantial economies due to the lower cost of manufacturing large diameter wire over the smaller diameter wire.

It will be understood that the present invention does not limit itself to a specific number of strands in a cord. As examples, a cord may have two or more strands, and a strand may have three or more filaments. Practical constructions may be two, three or four strands, of three, four, five or six wires each. The constructions of the present invention provide many benefits. Typically, the construction results in an equalization of filament lengths so that each filament takes an equal share of the load. The strength-to-weight ratio is higher than conventional cords. This would permit using either less weight of cord per tire or using the same cord in larger tires. Also the cords have an open characteristic permitting improved rubber penetration into the interstices of the cord. The aforedescribed mechanics of twisting causes the forces to be in the direction which cause the filaments or strands to lock the cord and prevent flaring of the cord. This is the result of the balance of stresses between the filaments, strands and cords.

Cords made in the aforedescribed manner need not be wrapped to prevent flare, or unwinding. Also cords made according to present invention have a handling characteristic entirely different than conventional cords. They, in a sense, are quite similar to textile cords. Also cords made in the manner of this invention may be overwrapped in a conventional and known manner with a single overlay to provide a product which may have a beneficial forming effect when bending over tire beads in the construction of a tire carcass.

Also the aforenoted cord manufacturing costs are substantially reduced because of the economies in manufacturing larger diameter wires for the strands of the cord.

As an example of the benefits of the present invention a 4 × 6 × 0.0073 inches cord constructed in accordance with this invention as compared with a wrapped conventional 7 × 4 × 0.0069 inches + 1 × 0.0059 inches shows the aforementioned 4 × 6 construction to have approximately the same ultimate cord strength at 89% of the weight per foot. The total input strength is less than the 7 × 4 construction and the construction of the present invention provides an increased cord strength efficiency. Also the present construction is equal to or provides better rubber adhesion despite a 10% reduction in surface area as compared to the above 7 × 4 cord. Additionally the cord of the present invention provides for a slight increase in elongation, and a favorable stiffness despite the use of large diameter wires or filaments of the order above noted. The cord of the present invention also has mechanical characteristics equal to or better than prior cord constructions.

As before mentioned the cord of this invention may, if desired, include an overlap wire. In the aforementioned 4 × 6 × 0.0073 inches cord, the strands may be overwrapped with a wrap wire of 0.0059 inch in diameter.

The invention claimed is:

1. A cord comprising a plurality of strands of steel wires twisted together, and having axially extending interstices opening radially between the wires of each of the strands, and in which the wires of the strands are substantially free of twist but have a permanent set providing force for locking together the twisted strands of the cord.

2. The method of making a cord comprising the steps of providing a plurality of strands each having a plurality of steel wires twisted together in one direction, and then twisting said strands together in a direction opposite the direction of the twisting together of said wires in said strands to substantially free the wires of the strands of twist and provide a permanent setting force for locking the twisted strands together and with axially extending interstices opening radially between the wire of each of the strands.

3. An article comprising a cord embedded in a body of elastomeric material, said cord comprising a plurality of strands of steel wires twisted together and having axially extending interstices opening radially between the wires of each of the strands in which each of the wires of the strands is embedded in the elastomeric material, and said wires in each of said strands being substantially free of twist but having a permanent set for locking together the twisted strands of the cord.

4. The cord of claim 1 in which the plurality of strands are in a range of from two to four in number, and in which each strand is composed of from three to six wires.

5. The cord of claim 1 in which the strands are four in number, and in which each strand is composed of six wires each being of a diameter of 0.0073 inch.

6. The cord of claim 5 in which the strands are wrapped with a wrap wire of 0.0059 inch in diameter.

7. The method of claim 2 in which the plurality of strands are in the range of from two to four in number, and in which each strand is composed of from three to six wires.

8. The method of claim 2 in which the strands are four in number, and in which each strand is composed of six wires each being of a diameter of 0.0073 inch.

9. The method of claim 8 in which the strands are wrapped with a wrap wire of 0.0059 inch in diameter.

10. The article of claim 3 in which the plurality of strands are in a range of from two to four in number, and in which each strand is composed of from three to six wires.

11. The article of claim 3 in which the strands are four in number, and in which each strand is composed of six wires each being of a diameter of 0.0073 inch diameter.

12. The article of claim 11 in which the strands are wrapped with a wrap wire of 0.0059 inch in diameter.

* * * * *